US008681871B2

(12) United States Patent
Vilei et al.

(10) Patent No.: US 8,681,871 B2
(45) Date of Patent: Mar. 25, 2014

(54) METHOD FOR ENCODING SIGNALS, RELATED SYSTEMS AND PROGRAM PRODUCT THEREFOR

(75) Inventors: Antonio Vilei, Lecce (IT); Gabriella Convertino, Francavilla Fontana (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 125 days.

(21) Appl. No.: 13/372,214

(22) Filed: Feb. 13, 2012

(65) Prior Publication Data

US 2012/0189063 A1 Jul. 26, 2012

Related U.S. Application Data

(63) Continuation of application No. 11/215,313, filed on Aug. 29, 2005, now Pat. No. 8,139,642.

(51) Int. Cl.
*H04N 7/12* (2006.01)
*H04N 11/02* (2006.01)
*H04N 11/04* (2006.01)

(52) U.S. Cl.
USPC .................................. 375/240.16

(58) Field of Classification Search
USPC .................................. 375/240.16
See application file for complete search history.

(56) References Cited

U.S. PATENT DOCUMENTS

| | | | |
|---|---|---|---|
| 5,642,153 A | 6/1997 | Chaney et al. | |
| 6,072,831 A | 6/2000 | Chen | |
| 6,215,787 B1 | 4/2001 | Kovacevic et al. | |
| 6,460,153 B1 | 10/2002 | Chou et al. | |
| 6,697,426 B1 | 2/2004 | Van Der Schaar et al. | |
| 6,754,203 B2 | 6/2004 | Wah et al. | |
| 6,757,735 B2 | 6/2004 | Apostolopulos et al. | |
| 6,757,860 B2 | 6/2004 | Choi et al. | |
| 6,801,532 B1 | 10/2004 | Anandakumar et al. | |
| 7,430,336 B2 * | 9/2008 | Raveendran | 382/268 |
| 2004/0252901 A1 * | 12/2004 | Gunnewiek et al. | 382/240 |

FOREIGN PATENT DOCUMENTS

| | | |
|---|---|---|
| JP | 2002-198821 | 2/2004 |
| WO | 2004/046879 A2 | 6/2004 |

OTHER PUBLICATIONS

Apostolopoulos, et al. "Unbalanced Multiple Description Video Communication Using Path Diversity"; IEEE International Conference on Image Processing (ICIP); Oct. 2001; pp. 966-901; vol. 1; Thessaloniki, Greece.

Ekmekci, et al. "Unbalanced Quantized Multiple Description Video Transmission using Path Diversity"; SPIE, The International Society for Optical Engineering; published online Jun. 30, 2003; Berlin, Germany.

(Continued)

*Primary Examiner* — Jorge L Ortiz Criado
*Assistant Examiner* — Jeremaiah C Hallenbeck-Huber
(74) *Attorney, Agent, or Firm* — Hogan Lovells US LLP (57) ABSTRACT

A method for encoding video signals subjects the signals to unbalanced multiple description coding. The unbalanced multiple description coding codes a video signal in a first high resolution packet and a second low resolution packet and represents, respectively a first high resolution description and a second low resolution description. The unbalanced multiple description coding step includes using different intra refresh periods for the first and second high resolution descriptions, with an intra refresh period for the second low resolution description shorter than the intra refresh period of the first high resolution description.

4 Claims, 6 Drawing Sheets

(56) References Cited

OTHER PUBLICATIONS

Heng, et al. "End-To-End-Distortion Optimized Mode Selection for Multiple Description Video Coding"; IEEE; Mar. 18-25, 2005; pp. 905-908; vol. 5.

Comas, David, et al., "Unbalanced Multiple-Description Video Coding with Rate-Distortion Optimization", 2003; Hindawi Publishing Corporation; EURASIP Journal on Applied Signal Processing 2003: 81-90.

Comas, David, et al., "Rate-Distortion Optimization in a Robust Video Transmission Based on Unbalanced Multiple Description Coding", Multimedia Signal Processing, 2001 IEEE Fourth Workshop on, vol., No. pp. 581-586, 2001, doi: 10.1109/MMSP.2001. 962795, URL:http://www.ieeexplore.ieee.org/stamp/stamp.jsp?tp= &arnumber=962795&isnumber-207.

\* cited by examiner

METHOD FOR ENCODING SIGNALS, RELATED SYSTEMS AND PROGRAM PRODUCT THEREFOR

RELATED APPLICATION

The present application is a continuation of U.S. patent application Ser. No. 11/215,313 filed on Aug. 29, 2005. The disclosure of which is herein specifically incorporated by this reference in its entirety.

FIELD OF THE INVENTION

The present invention relates to coding techniques, for instance for video signals. The present invention can be applied to any multicast/broadcast video distribution scenario where packet loss may occur. The proposed technique is particularly suitable for video transmission in Wireless Local Area Network (WLAN) hotspots and for video broadcasting in Third Generation (3G) cellular networks.

BACKGROUND OF THE INVENTION

Video communication over lossy packet networks such as the Internet or wireless links is hampered by packet loss. Indeed, video quality severely degrades in presence of lost packets.

Furthermore, video communication over lossy packet networks is hampered by limited bandwidth and packet loss. In fact, video coders commonly use predictive coding schemes in order to reduce temporal correlation, and the main drawback of these schemes is that even a single packet loss may cause errors during the decoding process that propagate in time.

Intra coding may be used to limit the effect of errors, however the high bit rate required limits its use in many applications.

Another common way to increase the robustness of the coded stream and to reduce the length of error propagation is the use of the Forward Error Correction (FEC) codes. This last solution provides robustness to packet loss at expenses of coding efficiency. The main limitation of Forward Error Correction codes is the "threshold effect": when the number of lost packets exceeds the correction capability of the code (e.g. the number of redundant packets for Reed-Solomon codes), the code is unable to correct the errors, thus causing quality degradation.

Layered or scalable approaches essentially prioritize data and thereby support intelligent discarding of the data (the enhancement data can be lost or discarded while still maintaining usable video), however the video can be completely lost if there is an error in the base layer.

Multiple Description (MD) Coding attempts to overcome this problem by coding a signal into multiple independent bit-streams such that any bit-stream can be used to decode a baseline signal. If one stream is lost, the other streams can still be decoded to produce usable video, and most importantly, the correctly received streams enable improved state recovery of the corrupted stream. It is possible to use information from the multiple streams to perform state recovery at the decoder. The main problem of Multiple Description is coding inefficiency. At the same rate, a single description produces higher quality than Multiple Description.

To overcome this limitation, some solutions based on Unbalanced Multiple Descriptions (UMD) have been investigated by researchers.

With unbalanced operation, the descriptions have different importance during the video reconstruction process. This way, it is simpler to control the amount of redundant data to add.

To achieve unbalanced operation one can adapt the quantization, the frame rate and the spatial resolution.

With unbalanced operation, different descriptions have different importance during the video reconstruction process. Many different systems to generate the Unbalanced Descriptions (UD) have been analyzed in the related prior art. The existing techniques are based on:
- particular transformations,
- energy considerations,
- frame rescaling operations, and
- different quantization operations.

Many prior art solutions have been designed to send the descriptions over different channels. Indeed, some existing solutions exploit path diversity either at the link layer using different antennas, or at the Internet Protocol (IP) level using multiple senders.

Introducing path diversity at the link layer can complicate the design of the video devices, requiring link-layer modifications to allow cross-layer optimizations. On the other side, having a plurality of senders can complicate the network topology.

Document WO-A-2004/046879 discloses an apparatus and method for generating multiple descriptions of compressed data. In the apparatus and method, transform coefficients are generated from input data and quantized. An energy distribution of the quantized transform coefficients is generated. Based on the energy distribution, the transform coefficients are grouped into layers. By entropy coding different number of layers, multiple descriptions of compressed data are generated.

Document JP-2002/198821 discloses a method and a device for processing signal for transmission in wireless communication system. A multiple-description coder generates many different descriptions in a prescribed portion of signals in a wireless communication system by using Multiple Description Scalar Quantization (MDSQ) or another type of multiple description coding. The different descriptions in the prescribed portion of the signals are arranged in a plurality of packets, so that at least the first description in the prescribed portion may be arranged in the first packet and the second description may be arranged in the second packet. Each packet is transmitted by using a frequency hopping modulator and the hopping rate of the modulator is selected or constituted based, at least partially, on the number of descriptions generated with respect to the different portions of the signals.

In U.S. Pat. No. 6,801,532 a process of sending packets of real-time information at a sender includes the steps of initially generating at the sender the packets of real-time information with a source rate greater than zero kilobits per second, and a time or path or combined time/path diversity rate, the amount of diversity initially being at least zero kilobits per second. The process sends the packets, thereby resulting in a Quality of Service (QoS), and optionally obtains at the sender a measure of the Quality of Service. Rate/diversity adaptation decision may be performed at receiver instead. Another step compares the Quality of Service with a threshold of acceptability, and when the Quality of Service is on an unacceptable side of said threshold increases the diversity rate and sends not only additional ones of the packets of real-time information but also sends diversity packets at the diversity rate as increased.

In U.S. Pat. No. 6,754,203 a method for communicating data over a packet switched network comprises dividing data into a plurality of frames, with each frame described by at least a first and a second parameter. The second parameter has a high correlation. The first parameter is placed in a first and a second description, while the second parameter is interleaved to the first and second descriptions. The first and second descriptions are packetized and communicated over the network. Upon reception, the first parameters for a frame sequence are extracted from one of the packets, while the interleaved second parameters are extracted from both the packets. If a packet is lost, the missing first parameter may be obtained from another packet, while the missing second parameter may be reconstructed using a second parameter from the other packet.

In U.S. Pat. No. 6,757,735 a method and system for streaming media data to a fixed client and/or a mobile client are disclosed, providing for encoding media data to be streamed to a client into a first multiple description bit-stream and into a second multiple description bit-stream. The method then determines the appropriate plurality of servers from a network of servers onto which the first and second multiple description bit-streams should be distributed. Then it is provided for distributing the first and second multiple description bit-streams to the appropriate plurality of servers positioned at intermediate nodes throughout a network such that a client is provided with access to the media data via a plurality of transmission paths.

In U.S. Pat. No. 6,460,153 is described method based on a projection onto convex sets (POCS) for consistent reconstruction of a signal from a subset of quantized coefficients received from an N.times.K over-complete transform. By choosing a frame operator F to be the concatenization of two or more K.times.K invertible transforms, the POCS projections are calculated in R.sup.K space using only the K.times.K transforms and their inverses, rather than the larger R.sup.N space using pseudo inverse transforms. Practical reconstructions are enabled based on, for example, wavelet, sub-band, or lapped transforms of an entire image. In one embodiment, unequal error protection for multiple description source coding is provided. In particular, given a bit-plane representation of the coefficients in an over-complete representation of the source, it is provided coding the most significant bits with the highest redundancy and the least significant bits with the lowest redundancy. In one embodiment, this is accomplished by varying the quantization step-size for the different coefficients. Then, the available received quantized coefficients are decoded using a method based on alternating projections onto convex sets.

In U.S. Pat. No. 6,215,787 is disclosed a signal data processing method using equal importance packetization. Processing of image data and other types of signal data is provided by representing the signal data in such a way that, when separated into packets, all packets are of approximately the same importance. As a result, if some of the packets are, for example, randomly lost in a lossy packet network, the resulting degradation in a reconstructed version of the signal is substantially uniform regardless of which packets are lost. A given image or other signal may be separated into packets using an energy equalization process, a signal whitening process, or other suitable technique.

The topics considered form the subject of extensive technical literature, as witnessed e.g. by the following technical papers:

"Unbalanced Quantized Multiple Description Video Transmission using Path Diversity", Sila Ekmekci, Thomas Sikora, Technical University Berlin, in which it is disclosed an approach to Multiple Description based on the Multiple State Video Coding achieving a flexible unbalance rate of the two streams by varying the quantization step size while keeping the original frame rate constant. The total bit-rate RT is fixed which is to be allocated between the two streams. If the assigned bit-rates are not balanced there will be PSNR (peak signal to noise ratio) variations between neighbouring frames after reconstruction. It is attempted to find the optimal rate allocation while maximizing the average reconstructed frame PSNR and minimizing the PSNR variations given the total bit-rate RT and the packet loss probabilities p1 and p2 over the two paths. The reconstruction algorithm is also taken into account in the optimization process. Results presenting optimal system designs for balanced (equal packet loss probabilities) but also for unbalanced path conditions (different packet loss probabilities) are reported;

"Unbalanced Multiple Description Video Coding With Rate-Distortion Optimization", David Comas, Raghavendra Singh, Antonio Ortega and Ferran Marques, deals with the problem of robust streaming of video data over best effort packet networks, such as the Internet, proposing multiple descriptions coding to protect the transmitted data against packet losses and delay, while also ensuring that the transmitted stream can be decoded with a standard video decoder, such as the H.263 decoder. The video data is encoded into a high resolution, i.e., high quality, video stream (description) using an encoder that produces an H.263 compliant stream. In addition, a low-resolution video stream (description) is also generated by duplicating the important information from the high-resolution video stream. This information includes the headers, the motion vectors and some of the discrete cosine transform (DCT) coefficients of the high resolution video stream. The remaining DCT coefficients are set to zero in the low-resolution video stream. Hence both video streams are independently decodable by a standard H.263 video decoder. However, only in case of a loss in the high-resolution video stream, the corresponding information from the low resolution video stream is decoded, else the received high resolution video stream is decoded. Thus the system is an example of an unbalanced MDC system where the low-resolution description is used only in case of losses in the high-resolution description. An optimization algorithm is disclosed which, given the probability of packet loss, allocates bits to the high resolution and low resolution descriptions, and selects the right number of coefficients to duplicate in the low resolution description, so as to minimize the expected distortion. The article refers to MD video coder using a similar rate allocation scheme however generating balanced descriptions;

"End-To-End Rate-Distortion Optimized Mode Selection For Multiple Description Video Coding", Brian A. Heng, John G. Apostolopoulos, and Jae S. Lim, discloses use of Multiple Description video coding to reduce the detrimental effects caused by transmission over lossy packet networks. Each approach to MD coding consists of a tradeoff between compression efficiency and error resilience. How effectively each method achieves this tradeoff depends on the network conditions as well as on the characteristics of the video itself. This paper proposes an adaptive MD coding approach, which adjusts to these conditions through the use of adaptive MD mode selection. The encoder selects between MD coding modes in a rate-distortion optimized manner to most effectively trade-off compression efficiency for error resilience;

"A Novel Error-Concealment Algorithm for an Unbalanced Multiple Description Coding Architecture", Marco Fumagalli, Rosa Lancini, and Stefano Tubaro, discloses, in order to increase the robustness of the coded stream and to reduce the length of error propagation, the use of a Multiple Description Coding technique, applying a novel sequence-based Error Concealment (EC) algorithm to an unbalanced MD video coding system that generates a High-Resolution (HR) and a Low-Resolution (LR) description. In order to recover a loss in the current frames the EC algorithm takes into account not only the spatial neighboring of the region to which correspond the data loss, but it looks also at what will happen in a significant number of future frames looking both the HR and the LR descriptions;

"Unbalanced Multiple Description Video Communication Using Path Diversity", John G. Apostolopoulos and Susie J. Wee, combines MD video coding with a path diversity transmission system for packet networks such as the Internet, where different descriptions are explicitly transmitted through different network paths, to improve the effectiveness of MD coding over a packet network by increasing the likelihood that the loss probabilities for each description are independent. The available bandwidth in each path may be similar or different, resulting in the requirement of balanced or unbalanced operation, where the bit rate of each description may differ based on the available bandwidth along its path. The MD video communication system disclosed is effective in both balanced and unbalanced operation. Specifically, unbalanced MD streams are created by carefully adjusting the frame rate of each description, thereby achieving unbalanced rates of almost 2:1 while preserving MD effectiveness and error recovery capability.

From the foregoing description of the current situation, it emerges that there exists the need to define solutions capable of dealing with multicast video transmissions in a more satisfactory way as compared to the solutions according to the known art described previously.

SUMMARY OF THE INVENTION

The object of the invention is thus to provide a fully satisfactory response to this need.

According to the present invention, that object is achieved by means of a method having the features set forth in the claims that follow. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

The solution described herein generates two descriptions having different resolution and different quantization. The solution uses different intra refresh periods (and thus different Group Of Pictures (GOP) structures) for the produced descriptions. In particular the solution employs shorter intra refresh period for Low Resolution (LR) description (in order to improve its resilience to packet losses), and higher intra refresh period for High Resolution (HR) description (in order to improve coding efficiency). All prior art solutions based on different resolutions and/or different quantization, instead, use the same intra refresh period for all the descriptions.

Another difference of the solution described herein compared to existing techniques is the packetization scheme. The latter keeps into account the network Maximum Transfer Unit (MTU) in order to achieve good network efficiency.

Indeed the joint High Resolution and Low Resolution encoders exchange information in order to produce Unbalanced Multiple Description (UMD) packets having size equal to the Maximum Transfer Unit. The communication between High Resolution and Low Resolution encoders allows them to adjust the packet size and the quantization so that the aggregation of High Resolution and Low Resolution packets has size equal to the Maximum Transfer Unit. Moreover, this communication between the encoders allows the packetizer to keep constant the frame offset between High Resolution and Low Resolution packets aggregated in a single Unbalanced Multiple Description packet. Without such an approach, the offset could not be kept constant and the size of the aggregated packet would be either smaller or bigger than Maximum Transfer Unit, causing network inefficiency.

The packetization scheme described herein has been designed for use on a single channel, without the need to change existing link layer technology. The solution does not need a cross-layer approach, and therefore is link-layer independent. Moreover, this packetization scheme does not need to have multiple senders at IP layer and so it does not complicate network topology.

BRIEF DESCRIPTION OF THE DRAWINGS

The invention will now be described, by way of example only, with reference to the enclosed figures of drawing, wherein.

DETAILED DESCRIPTION OF PREFERRED EMBODIMENTS OF THE INVENTION

The solution described herein illustrates a set of techniques based on Unbalanced Multiple Description Coding (UMD) to improve the robustness of video transmissions.

The exemplary system described herein relies on two descriptions, a HR (High Resolution) description and LR (Low Resolution) description. The High Resolution description has higher quality than the Low Resolution one. The High Resolution and the Low Resolution descriptions are produced by using different encoding parameters.

The solution described, compared to other techniques based on Unbalanced Multiple Description, makes use of different intra refresh periods (and thus different Group Of Pictures (GOP) structures) for the produced descriptions. In particular the solution proposes to use shorter "intra refresh" period for the Low Resolution description (in order to improve its resilience to packet losses), and higher "intra refresh" period for the High Resolution description (in order to improve coding efficiency). A packetization scheme has been introduced in order to optimize network performance. The techniques described herein are able to produce acceptable quality even if redundancy percentage is less than packet loss rate.

In this scheme the Low-Resolution (LR) description is primarily used as redundancy, and it is employed to conceal errors (or losses) in the High-Resolution (HR) description, and vice-versa. The Low Resolution stream in the Unbalanced Multiple Description case although has some similarity with the redundancy added by the code in the Forward Error Correction approach, is different since the Forward Error Correction is a general technique, independent of video encoding technology, while the Unbalanced Multiple Description is able to exploit video properties.

The Low Resolution bandwidth is a small fraction of the High Resolution one. Using the same packet size for both the High Resolution and the Low Resolution, then the number of Low Resolution packets would be much less than the number of High Resolution packets.

Moreover, a single Low Resolution packet would include more macroblocks than an High Resolution one: a single packet loss in the Low Resolution stream corresponds to the loss of a greater number of packets in the High Resolution stream. This would reduce the error-recovery capability of such an approach. To overcome this problem, it is desirable that the total number of Low Resolution packets be approximately equal to the number of High Resolution packets. This means that the Low Resolution packet size must be smaller than the High Resolution one.

As most Multiple Description and Unbalanced Multiple Description techniques use the same "intra" period for all the descriptions, as already mentioned, the solution described herein uses a lower "intra" period (more frequent "intra refresh") for the Low Resolution stream compared to the High Resolution one. Even if this solution reduces the coding efficiency for the Low Resolution stream, it preserves the efficiency of the High Resolution stream. On the other side, it makes the Low Resolution more robust to packet loss. Intra refresh can also be coordinated among descriptions to ensure that at least one description has been recently refreshed for every frame.

When the same frame is lost in both the High Resolution and in the Low Resolution, error propagation can be stopped as soon as a Low Resolution intra frame is received. The reconstructed video will be low quality, until a High Resolution intra frame is received. Even if Low Resolution is low quality, it is intelligible.

The High Resolution and the Low Resolution encoders produce packets ready to be encapsulated in Realtime Transport Protocol (RTP). Best results can be achieved if packet losses of the two streams are uncorrelated. Virtual independent channels can be created by suitable interleaving policy between High Resolution and Low Resolution packets. A possible packetization scheme would use two different Realtime Transport Protocol sessions, one for the High Resolution and one for the Low Resolution streams.

The main problem of this approach is its network inefficiency, since half of the packets would be very small. The solution described herein overcomes this limitation by aggregating a High Resolution packet and a Low Resolution packet in a single User Datagram Protocol (UDP) packet.

The Unbalanced Multiple Description architecture is described by analyzing both the sender (the encoder) and the receiver (the decoder) sides.

Figure 1:
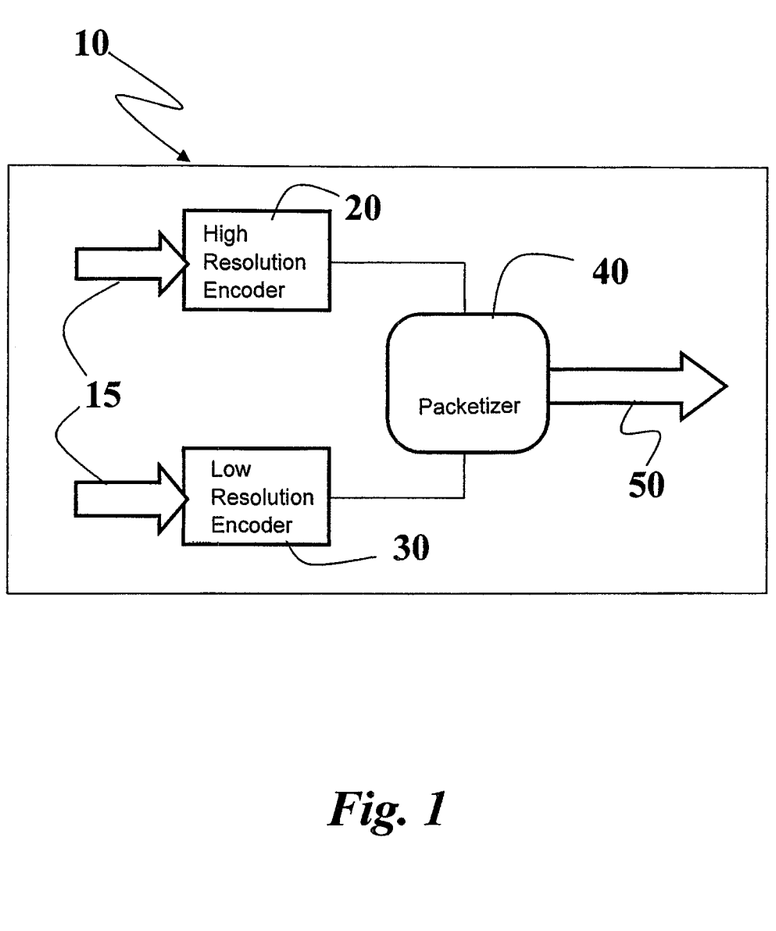
FIG. 1 shows an exemplary block diagram of a sender.

FIG. 1 represents the main blocks of a system for encoding video signals, or sender, 10.

A video input 15 is fed to a H264 encoder 20, that produces a stream of High Resolution packets, and to a H264 encoder 30, that produces a stream of Low Resolution packets. Such two streams are fed to a packetizer block 40.

Both the encoders receive the same uncompressed video input 15. They use the same codec but with different encoding parameters. The High Resolution and the Low Resolution encoders generate respectively the HR (High-Resolution) and LR (Low-Resolution) video streams. The High Resolution is the primary stream and the Low Resolution is the redundant one.

The output packets from the High Resolution encoder 20 and the Low Resolution encoder 30 are taken as input by a packetizer 40. The latter block 40 aggregates the High Resolution and the Low Resolution packets into a single Unbalanced Multiple Description packet 50.

The aggregation scheme operates by aggregating a Low Resolution packet belonging to frame n and a High Resolution packet belonging to frame k (with k=n−Offset). The Offset value can be an integer number within a given interval, bounded by a minimum and a maximum value. In the tests the offset has been bounded between 30 and 35 values. Greater values for the Offset can help achieving uncorrelation between the High Resolution and the Low Resolution packet losses. On the other side, to a greater Offset corresponds a greater delay and a greater buffering requisite imposed on the receivers.

Figure 2:
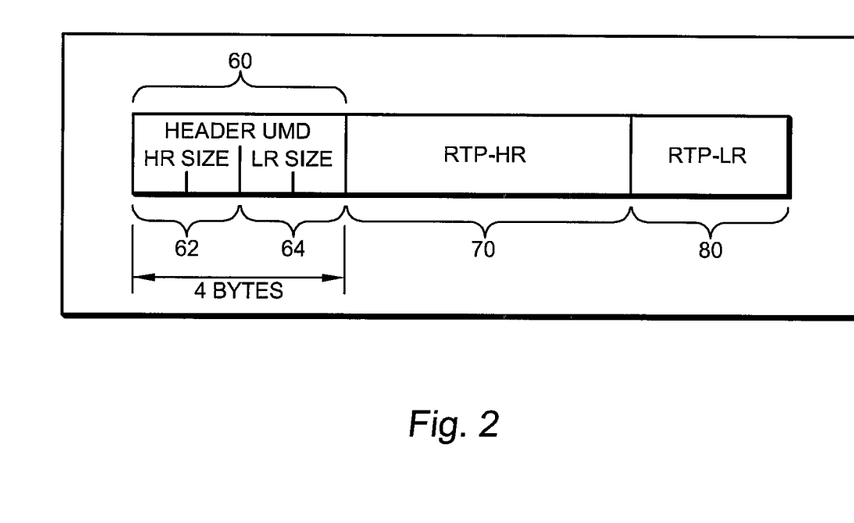
FIG. 2 shows an example of Unbalanced Multiple Description payload format.

An example of Unbalanced Multiple Description payload format is represented in FIG. 2.

An Unbalanced Multiple Descriptions header 60 is 4 octets long. A High Resolution size field 62 (the most significant 2 octets) represents the length of a High Resolution packet 70. If the Unbalanced Multiple Descriptions packet includes only a Low Resolution packet 80, then the High Resolution size field 62 is null.

A Low Resolution size field 64 (the remaining 2 octets) represents the length of the Low Resolution packet 80. If the Unbalanced Multiple Descriptions packet includes only the High Resolution packet 70, then the Low Resolution size field 64 is null.

After the payload there is the High Resolution packet 70 (if available) followed by the Low Resolution packet 80 (if available). Both the High Resolution size field 62 and the Low Resolution size field 64 cannot be null at the same time.

A very small fraction of the Unbalanced Multiple Descriptions packets may include only a High Resolution packet or only a Low Resolution one. This may happen because the packetizer block 40 must keep approximately constant the offset between the High Resolution and the Low Resolution, and because the maximum size of an aggregated Unbalanced Multiple Descriptions packet must not exceed the network Maximum Transfer Unit (MTU).

Indeed, exceeding the Maximum Transfer Unit would require IP fragmentation, so that each fragment does not exceed the Maximum Transfer Unit and can be sent on the network.

If a single fragment of an IP datagram were lost, all the correctly received fragments belonging to that same datagram would need to be deleted. This may cause severe network performance degradation, especially on wireless links and/or in congested networks. On the other side, if the produced packets are much smaller than the Maximum Transfer Unit, network is used inefficiently (excessive overhead).

Summarizing, the solution described herein poses the following fundamental constraints in order to achieve robust and efficient operation:

the Low Resolution bandwidth is a pre-defined small fraction of the High Resolution bandwidth;

the High Resolution and the Low Resolution have a similar number of total packets;

the Offset between the High Resolution and the Low Resolution packets aggregated in a single Unbalanced Multiple Descriptions packet is kept approximately constant;

the size of aggregated Unbalanced Multiple Descriptions packets is kept as close as possible to the Maximum Transfer Unit, without exceeding the Maximum Transfer Unit.

In order to satisfy the constraints, one can tune the quantization, the Realtime Transport Protocol packet size and other encoding parameters. If the High Resolution encoder 20 and the Low Resolution encoder 30 were independent, satisfying those constraints would be really complex and would require a great number of consecutive trials. Thus, independently encoding the High Resolution and the Low Resolution streams, is not a practical solution.

The technique described herein proposes to use joint encoding between the High Resolution and the Low Resolution encoders, so that consecutive trials are not needed. The joint encoders exchange a great number of statistics about the status of the produced streams, and take immediate actions to satisfy the constraints.

For example, if the number of the High Resolution packets is too big compared to the Low Resolution ones, the High Resolution encoder 20 will increase its current Realtime Transport Protocol packet size, while the Low Resolution encoder 30 will decrease its current one. Corrective actions in the encoders may tune any combination of encoding parameters on the fly, thus guaranteeing that the four constraints stated above are satisfied.

Moreover, the joint encoding process is computationally more efficient than independent encoding because some operations can be executed only once. For example, Motion Estimation may be performed only in the High Resolution encoder 20: the Low Resolution encoder 30 could use a rescaled version of the High Resolution motion vectors.

The technique described herein uses joint encoding to improve the packetization scheme and network efficiency.

As stated, most Unbalanced Multiple Descriptions techniques use the same "intra" period for all the descriptions. The technique described herein uses a lower "intra" period for the Low Resolution stream compared to the High Resolution one. In the tests 12 frames intra period has been used for the High Resolution stream and only 3 frames intra period for the Low Resolution stream. Even if this solution reduces the coding efficiency for the Low Resolution, it preserves the efficiency of the High Resolution. The advantage is that the Low Resolution stream becomes more robust to packet loss.

When the same frame gets lost in both the High Resolution and the Low Resolution streams, error propagation can be stopped as soon as a Low Resolution intra frame is received. The reconstructed video will be low quality, until a High Resolution intra frame is received. However, even if the Low Resolution is low quality, it is intelligible.

Figure 3:
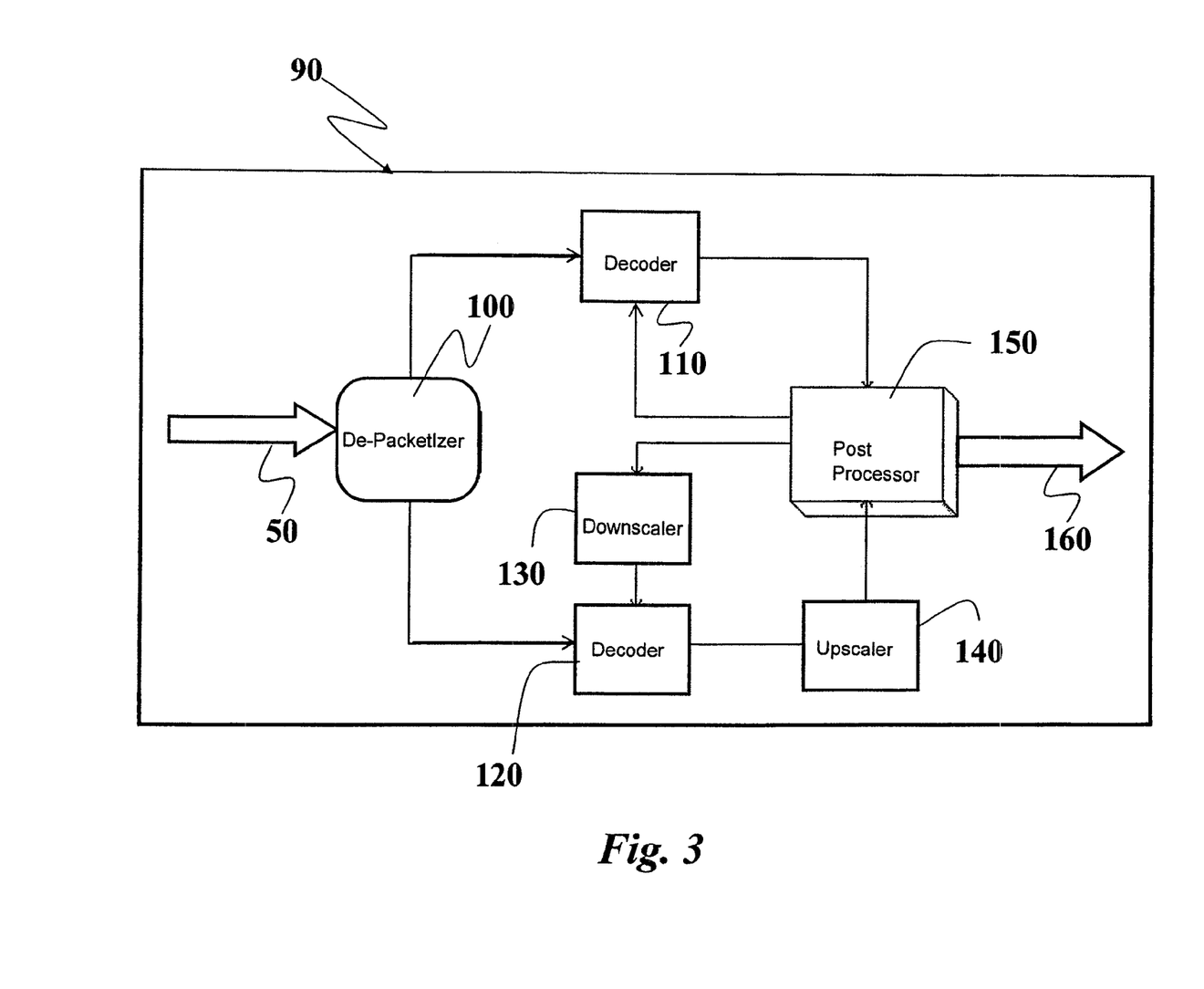
FIG. 3 shows an exemplary block diagram of a receiver.

FIG. 3 represents the main blocks of a receiver 90.

The receiver 90 decodes the received packets 50 of the Unbalanced Multiple Descriptions stream and performs an Error Concealment (ERC) operation.

The receiver block 90 comprises a de-packetizer block 100, a H264 decoder 110 (that creates the High Resolution stream) and a H264 decoder 120 (that creates the Low Resolution stream). The receiver block 90 further comprises a downscaler block 130, an upscaler block 140 and a postprocessor block 150.

The de-packetizer block 100 extracts the High Resolution and the Low Resolution packets from the Unbalanced Multiple Descriptions packet. The extracted packets are sent to their respective decoders 110 and 120. After decoding, the Low Resolution frames are upscaled to High Resolution by the upscaler block 140. HR frame and the upscaled version of LR frame are taken as input by the postprocessor block 150. The latter performs Error Concealment (ERC). If a given macro-block has been lost in the High Resolution frame, it can be recovered from the corresponding macro-block of the Low Resolution frame.

When performing Error Concealment operation, the postprocessor 150 operates on frames from the High Resolution and the Low Resolution with the same sequence number. The frame produced by the postprocessor 150 is sent to the playback unit and is also sent back to the decoders. The output frame is downscaled in block 130 before being accepted by the Low Resolution decoder 120.

Figure 4:
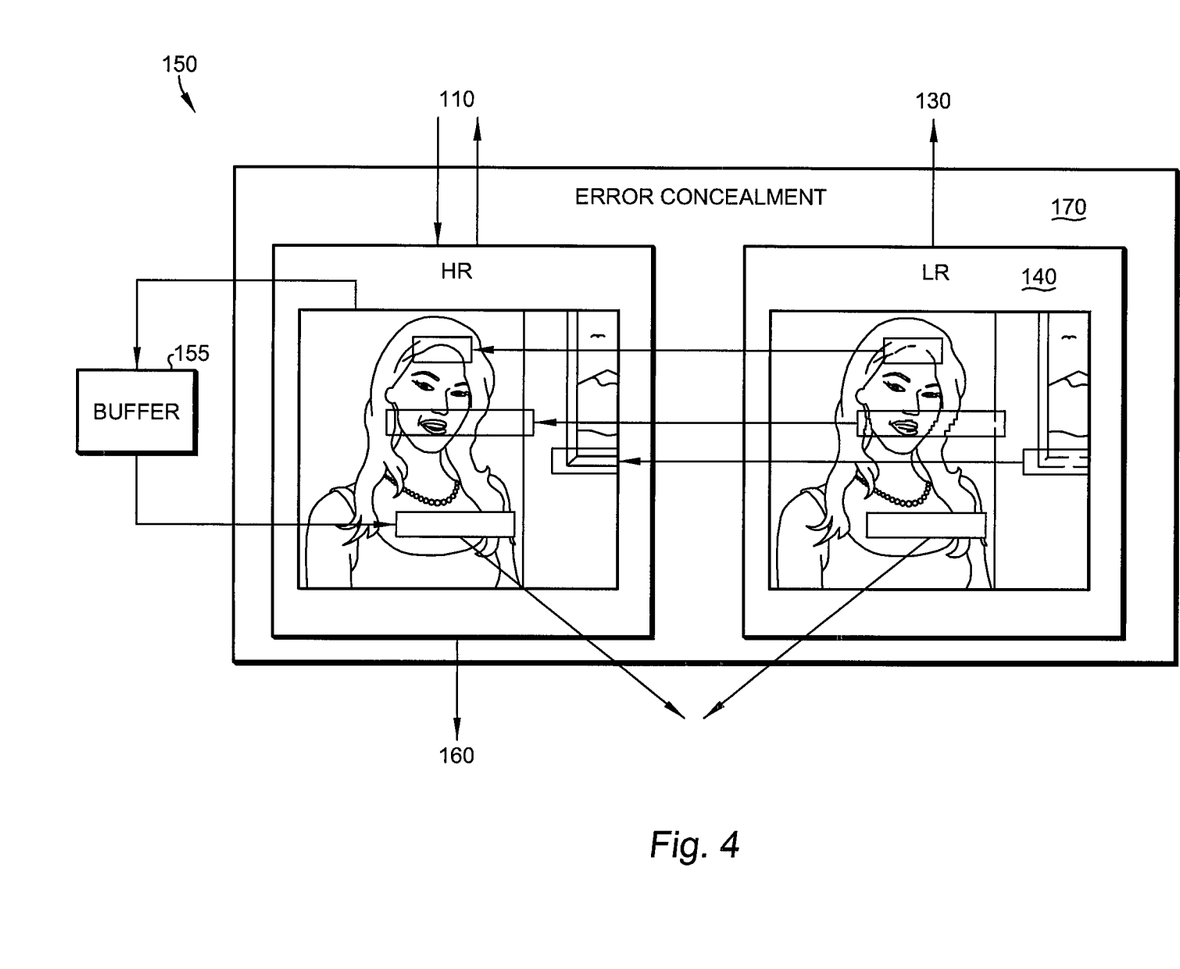
FIG. 4 shows the operating mode of a postprocessor according to the present invention.

FIG. 4 describes how the postprocessor 150 operates. The postprocessor 150 receives n-th frame from the HR decoder 110 and from the upscaler 140.

The postprocessor 150 includes an Error Concealment (ERC) block 170 and a buffer 155. The High Resolution and the Low Resolution frames having the same sequence number are taken as input by the postprocessor 150. The latter performs error detection to identify corrupted macro-blocks in the decoded High Resolution frame and the upscaled Low Resolution one. If a given macro-block has been correctly decoded by both the High Resolution and the Low Resolution, only the High Resolution macro-block is used: the Low Resolution macro-block is discarded because it has lower quality.

On the other side, if a macro-block has been correctly decoded only in one of the two frames, the postprocessor 150 will use only the correct one. If a macro-block is corrupted in both the High Resolution and the Low Resolution frames, then the postprocessor 150 will copy the corresponding macro-block from the previous concealed frame (stored in buffer 155).

After concealment, the output frame is sent to the playback unit and to the High Resolution decoder and the Low Resolution one (passing through the downscaler 130). The frame is also copied in the postprocessor buffer 155 for future reference.

Sending the concealed frames back to the High Resolution and the Low Resolution decoders is useful because it effectively limits error propagation. Without this feedback, in fact, the decoders would not be able to correctly decode frames depending on corrupted reference frames.

This joint decoding process results in a concrete improvement of video quality compared to the independent decoding of the High Resolution and the Low Resolution streams. When a concealed frame is based on the Low Resolution stream, its quality is not optimal but intelligibility is preserved.

The Unbalanced Multiple Descriptions technique is suitable for multicast/broadcast video distribution where estimating packet loss can be a difficult task because different receivers experience different loss patterns.

Figure 5:
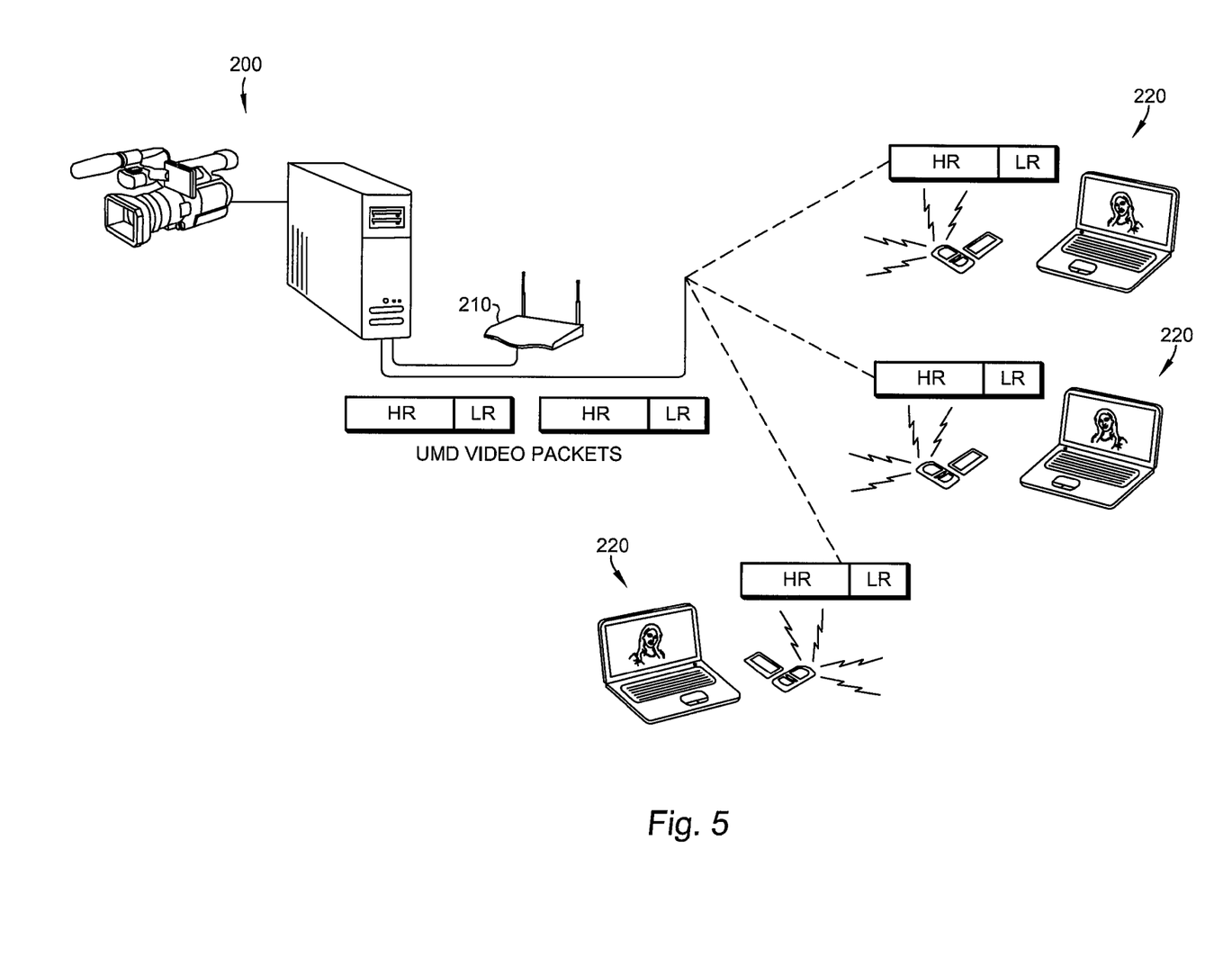
FIG. 5 shows an example of video streaming in a WLAN scenario.

Multicast video streaming over a Wireless LAN network is a possible scenario where this technique provides good results. This scenario is shown in FIG. 5.

In this scenario, a video streaming server 200 in a hotspot Access Point 210 could generate the Unbalanced Multiple Descriptions packets in order to increase video resilience to packet loss. The Unbalanced Multiple Descriptions packets include the High Resolution and the Low Resolution streams, as described in the foregoing. The WLAN Access Point 210 sends the multicast Unbalanced Multiple Descriptions video packets to the Laptops associated to it.

The video can be correctly decoded by Unbalanced Multiple Descriptions-aware laptop PCs 220, PDAs and handheld devices, independently of their specific packet loss pattern. No feedback is required from the receivers. Each laptop 220 is able to reconstruct the video even if some Unbalanced Multiple Descriptions packets get lost.

Figure 6:
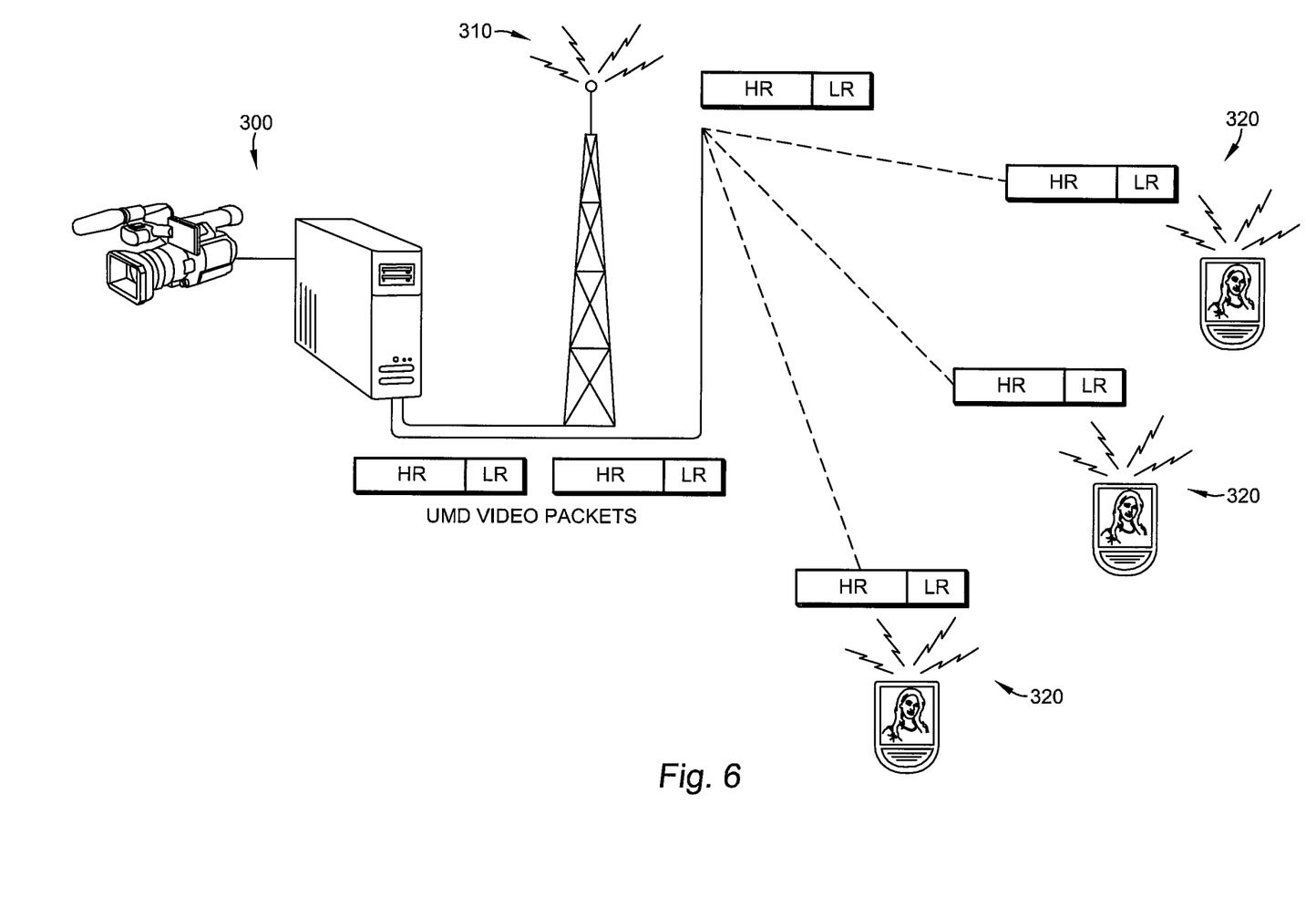
FIG. 6 shows an example of video streaming in a 3G scenario.

FIG. 6 shows the video streaming over a 3G scenario.

Another scenario where the solution can provide good results is the video broadcasting over a 3G cells (Third generation mobile cells).

In this case, a video streaming server 300 could generate Unbalanced Multiple Descriptions packets to be sent in broadcast via a 3G base station 310. The Unbalanced Multiple Descriptions packets include the High Resolution and the Low Resolution streams, as described. The 3G base station 310 broadcasts the Unbalanced Multiple Descriptions video packets to 3G mobile phones 320 in its cell. Each mobile phone 320 with Unbalanced Multiple Descriptions video capabilities will be able to conceal the errors caused by lost packets independently of its specific packet loss pattern.

It is now considered the case where a small set of receivers suffers heavy packet loss (the mobile phones near the border of the cell), while the others (the majority) experience only occasional losses. The Forward Error Correction based techniques would require a high percentage of redundant data in order to guarantee acceptable quality to this small set of receivers. The Unbalanced Multiple Descriptions, instead, would require less redundancy to achieve the same goal. The same is true in the case where receivers experience good channel conditions for the majority of the time, and suffer heavy losses only for short periods (for example during hand-off). No feedback is required from the receivers.

The technique described herein provides good results even when there are long bursts of losses or when loss percentage is more than redundancy percentage. In particular, the Unbalanced Multiple Descriptions is effective even if loss percentage has been underestimated.

Consequently, without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

The invention claimed is:

1. A system for receiving and decoding, to macroblocks of frames, a signal comprising a single packet aggregate of a high resolution packet and a low resolution packet, said signal produced by unbalanced multiple description coding of video signals using different intra refresh periods, an intra refresh period for said low resolution packet being shorter than the intra refresh period for said high resolution packet, said system comprising:

a de-packetizer module configured for extracting said high resolution packet and said low resolution packet from said single packet, said de-packetizer module sending said extracted high resolution packet and said low resolution packet to a respective first decoder and a second decoder, said first decoder and said second decoder supplying respectively a high resolution and a low resolution frame to a postprocessor, said postprocessor configured for performing an error concealment operation, wherein the single packet aggregate is configured by aggregating the low resolution packet belonging to a first frame with index n and the high resolution packet belonging to a second frame with index k, said index k being equal to index n minus an offset value, and wherein the offset value is larger than one.

2. The system of claim 1 wherein the postprocessor is further configured for recovering from a low resolution frame macro-block when a given a high resolution frame macroblock has been lost.

3. The system of claim 1 wherein the postprocessor is further configured for performing error concealment operations by operating on said high resolution frames and said low resolution frames with a same sequence number, producing a playback frame that is sent to a playback unit, said playback frame being also sent back to said first decoder and said second decoder.

4. The system of claim 1 further comprising an upscaler module configured for receiving said low resolution frames from said low second decoder, said upscaler further configured for upscaling said low resolution frames for input to the postprocessor.

* * * * *